(12) United States Patent
Kimura et al.

(10) Patent No.: US 6,265,877 B1
(45) Date of Patent: Jul. 24, 2001

(54) METHOD FOR DETERMINING AN END OF DISCHARGE VOLTAGE FOR A SECONDARY BATTERY

(75) Inventors: Tadao Kimura, Kobe; Yusai Murakami, Toyohashi; Masaru Yonemoto, Kosai; Toshiaki Nakanishi, Toyohashi, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/308,447

(22) PCT Filed: Sep. 30, 1998

(86) PCT No.: PCT/JP98/04439

§ 371 Date: Jun. 11, 1999

§ 102(e) Date: Jun. 11, 1999

(87) PCT Pub. No.: WO99/17392

PCT Pub. Date: Apr. 8, 1999

(30) Foreign Application Priority Data

Sep. 30, 1997 (JP) ...................................... 9-266066

(51) Int. Cl.$^7$ .............................. G01N 27/416; H02J 7/14
(52) U.S. Cl. ........................... 324/427; 324/433; 320/136
(58) Field of Search .................................. 320/134, 135, 320/136, 162; 324/427, 433

(56) References Cited

U.S. PATENT DOCUMENTS

| 5,691,624 | 11/1997 | Im et al. . |
| 5,804,894 | * 9/1998 | Leeson et al. ........................ 307/130 |
| 6,023,151 | * 2/2000 | Hudson et al. ....................... 320/135 |

FOREIGN PATENT DOCUMENTS

| 8-78065  | 3/1996  | (JP) . |
| 8-185890 | 7/1996  | (JP) . |
| 8-336202 | 12/1996 | (JP) . |

* cited by examiner

Primary Examiner—Peter S. Wong
Assistant Examiner—Gregory J. Toatley, Jr.
(74) Attorney, Agent, or Firm—Jordan and Hamburg LLP

(57) ABSTRACT

Method for determining a determination voltage (end of discharge voltage) of a secondary battery having a nickel-hydroxide positive electrode based on the state of charge of the battery. The end of discharge voltage is determined in consideration of the voltages when the state of charge reaches a permissible lower limit after first and subsequent discharges of the battery. The voltage at which the state of charge reaches the lower limit for discharges after the first discharge gradually decreases due to a memory effect. As a result, the end of discharge voltage is lower than the voltage at which the state of charge reaches the lower limit after the first discharge.

18 Claims, 3 Drawing Sheets

METHOD FOR DETERMINING AN END OF DISCHARGE VOLTAGE FOR A SECONDARY BATTERY

BACKGROUND OF THE INVENTION

The present invention relates to a method of detecting remaining capacity for secondary batteries wherein nickel hydroxide is used as a positive electrode active material, such as a nickel metal-hydride secondary battery and a nickel cadmium secondary battery.

In appliances in which secondary batteries are used as a power source, it is necessary to detect the remaining capacity of the secondary batteries in order to prevent overdischarge and overcharge, so that the appliances are used within a suitable range of the remaining capacity of the batteries.

The remaining capacity of a secondary battery can be indexed by the state of charge (SOC) which indicates the rate of accumulated electrical quantities in relation to battery capacity. This SOC can be determined from voltage because charge/discharge characteristic curves corresponding to charge/discharge electric current and temperature can be determined through experimentation. That is, by detecting voltage at a certain electric current value and temperature, and by utilizing the charge/discharge characteristic curves corresponding to the above electric current value and temperature, the SOC of the battery can be obtained.

Accordingly, it is possible to detect, by measuring voltage of a secondary battery, whether the SOC after a final discharge (i.e., the last discharge before the battery is recharged) has reached a permissible lower limit (an SOC of 20%, for example). A determination is then made in accordance with the results whether further discharge will induce an overdischarged state, whereupon discharge can be stopped and the battery charged.

The determination voltage (also referred to as end of discharge voltage) for determining whether the SOC has reached a permissible lower limit as described above has usually been determined in the prior art as follows. The determination voltage was determined based on a discharge characteristic curve (complete discharge characteristic curve) indicative of the relationship between the SOC and voltage that is obtained at the time of complete discharge (first discharge). By way of example, in the case of the discharge characteristic curve A shown by solid lines in FIG. 1, the voltage value 1.237V that corresponds to the SOC of 20% was defined to be the determination voltage for determining whether the SOC has reached the permissible lower limit.

However, in the case of nickel metal-hydride or nickel-cadmium secondary batteries using nickel hydroxide as a positive electrode material, as the charge and incomplete discharge cycles are repeated, a memory effect is observed wherein, as shown in the discharge characteristic curves in FIGS. 2 and 3, voltage corresponding to the SOC decreases in accordance with the number of charge/discharge cycles (represented by [1]~[10]), and drops considerably, particularly at the final discharge. Thus, if the determination voltage is defined based on the complete discharge characteristic curve as above, there is a problem that it may be erroneously determined that the SOC has reached the permissible lower limit (for example, an SOC of 20%) although there actually remains a sufficient amount of remaining capacity (an SOC of 30%, for example) in the case where charge and discharge are repeated a large number of times as shown in FIG. 3.

SUMMARY OF THE INVENTION

An object of the present invention is to provide a method of detecting the determination or end of discharge voltage of secondary batteries using a nickel-hydroxide positive electrode, by which a correct determination of whether the SOC has reached a permissible lower limit even after the final discharge is possible by measuring the voltage of the batteries.

In order to achieve the above object, the method of detecting the determination voltage based on the SOC of a secondary battery which uses a nickel-hydroxide positive electrode according to a first aspect of the present invention includes the steps of setting a permissible lower limit of the SOC designed, for example, to prevent overdischarge of the battery, and determining the voltage of the battery when the SOC reaches the lower limit after multiple discharges, the voltage for discharges after the first discharge gradually decreases from the voltage after the first discharge due to a memory effect. Thereafter, the voltage for determination, i.e., the voltage at which discharge should be stopped and charging commenced, is determined in consideration of the voltages at which the SOC is the set lower limit after the multiple discharges whereby the determination voltage is lower than the voltage the battery reaches after the first discharge for the lower limit of the SOC, and a determination is made whether the SOC has reached the lower limit based on this voltage for determination, which entails a comparison of the actual voltage to the determination voltage.

According to the above method, the determination voltage is defined lower than the voltage when the SOC reaches the permissible lower limit after the first discharge in consideration of a memory effect observed in secondary batteries using a nickel-hydroxide positive electrode. As a result, even in the case of repeating charge and discharge cycles a large number of times, the actual SOC when it is determined to have reached the permissible lower limit can be made closer to the lower limit of the SOC defined as the determination reference.

It is preferable to set the voltage for determination 0.01~0.10V/cell lower than the voltage when the SOC reaches the permissible lower limit at the first discharge.

Also, to achieve the above object, the method of detecting the determination voltage based on the SOC of a secondary battery which uses a nickel-hydroxide positive electrode according to a second aspect of the present invention includes the steps of setting a permissible lower limit of the SOC designed, for example, to prevent overdischarge of the battery, and determining the voltage of the battery when the SOC reaches the lower limit after multiple discharges, the voltage for discharges after the first discharge gradually decreases from the voltage after the first discharge due to a memory effect. Several determination voltages are determined from the voltages at which the SOC is the set lower limit after the discharges and thus the determination voltage of the battery is variable in accordance with the number of times of charge and discharge of the battery.

According to the above method, the voltage for determination is defined in accordance with the number of charge and discharge cycles repeated in consideration of a memory effect observed in secondary batteries using a nickel-hydroxide positive electrode. As a result, at any time of discharge, the actual SOC when it is determined to have reached the permissible lower limit can be made remarkably closer to the lower limit of the SOC defined as the determination reference.

DETAILED DESCRIPTION

Preferred embodiments of the present invention will be hereinafter described with reference to the accompanying drawings for the understanding of the present invention. The method of determining the determination voltage based on the SOC in accordance with the present invention is applied to a nickel metal-hydride secondary battery for use as a power supply for driving an electric vehicle or a hybrid vehicle which uses a motor and engine in combination for a drive force, and is implemented for the purposes of controlling charge and discharge cycles in order to maintain the nickel metal-hydride secondary battery within a suitable range of application without falling into an overdischarge state.

Figure 2:
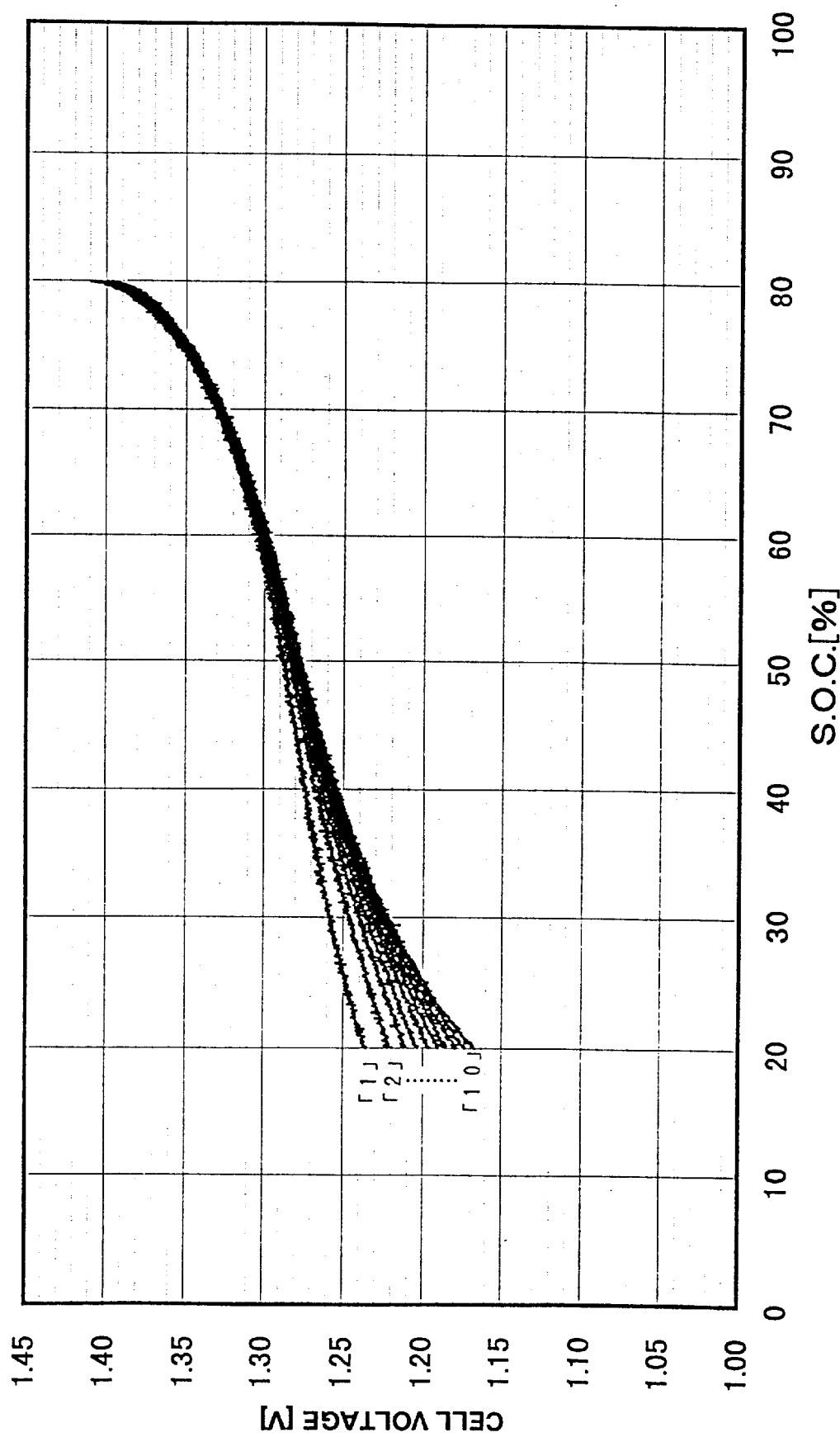
FIG. 2 is a graph showing discharge characteristic curves indicative of the relationship between the SOC and voltage at the time of discharge.
Figure 3:
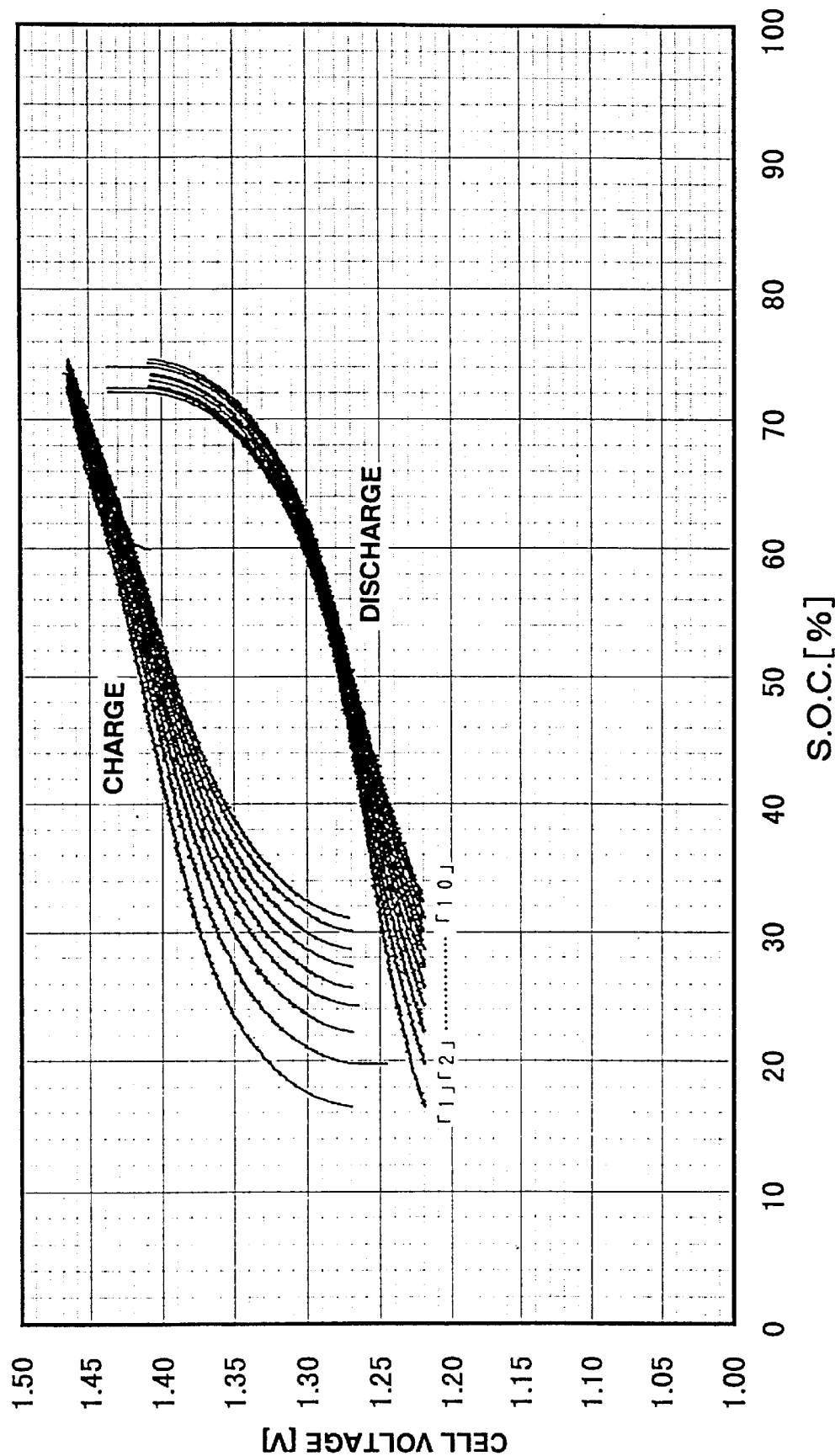
FIG. 3 is a graph showing charge and discharge characteristic curves indicative of the relationship between the SOC and voltage at the time of charge and discharge.

In secondary batteries that use nickel hydroxide as a positive electrode material such as the above mentioned nickel metal-hydride secondary battery, as charge and discharge cycles are repeated in which the discharge of the battery is not complete, a memory effect is observed wherein the voltage decreases from the value at the time of first discharge in accordance with the number of charge/discharge cycles, as can be seen from the discharge characteristic curves indicative of the relationship between the SOC and voltage in FIG. 2. Normally, charge and discharge of secondary batteries are controlled such that discharge is stopped when the SOC at the final discharge, i.e., the last discharge before charging begins, is detected to have reached a permissible lower limit (an SOC of 20%, for example) and switched to a charging state, in order to prevent damage to cells caused by overdischarge. Under such condition, a complete discharge is inhibited, as a result of which the occurrence of the above mentioned memory effect is inevitable.

The above mentioned discharge characteristic curves vary depending on discharge electric current and battery temperature. A number of discharge characteristic curves corresponding to each one of discharge electric currents and battery temperatures are thus preliminarily obtained.

FIG. 2 shows discharge characteristic curves corresponding to a certain discharge electric current and battery temperature, obtained through experimentation, including not only the one at the first discharge (which coincides with the complete discharge characteristic curve in this case), but also the discharge characteristic curves at the second to tenth time of repeating charge and discharge ([1]~[10] in FIG. 2 represent the number of times of charge and discharge). When the allowable lower limit of the SOC at the final discharge is set to be 20%, the voltage corresponding to the above lower limit decreases as the number of times of charge and discharge increases, as shown in Table 1 below.

TABLE 1

| Charge/discharge number of times | Voltage when the SOC is 20% | |
| --- | --- | --- |
| 1 | 1.237V | $V_{o1}$ |
| 2 | 1.222V | $V_{o2}$ |
| 3 | 1.212V | $V_{o3}$ |

TABLE 1-continued

| Charge/discharge number of times | Voltage when the SOC is 20% | |
| --- | --- | --- |
| 4 | 1.205V | $V_{o4}$ |
| 5 | 1.197V | $V_{o5}$ |
| 6 | 1.190V | $V_{o6}$ |
| 7 | 1.186V | $V_{o7}$ |
| 8 | 1.180V | $V_{o8}$ |
| 9 | 1.175V | $V_{o9}$ |
| 10 | 1.169V | $V_{o10}$ |

Accordingly, if the voltage for determination were to be determined based on the discharge characteristic curve at the first discharge (which coincides with the complete discharge characteristic curve) as in the prior art, it would be 1.237V under a condition that the permissible lower limit of the SOC is set at SOC 20%. However, it is irrational to use this value of 1.237V as the voltage for determination, in the light of the above mentioned memory effect. The voltage, for example, according to the discharge characteristic curve at the tenth discharge corresponding to an SOC of 20% is 1.169V, and there is a great difference between this and the voltage for determination 1.237V.

Figure 1:
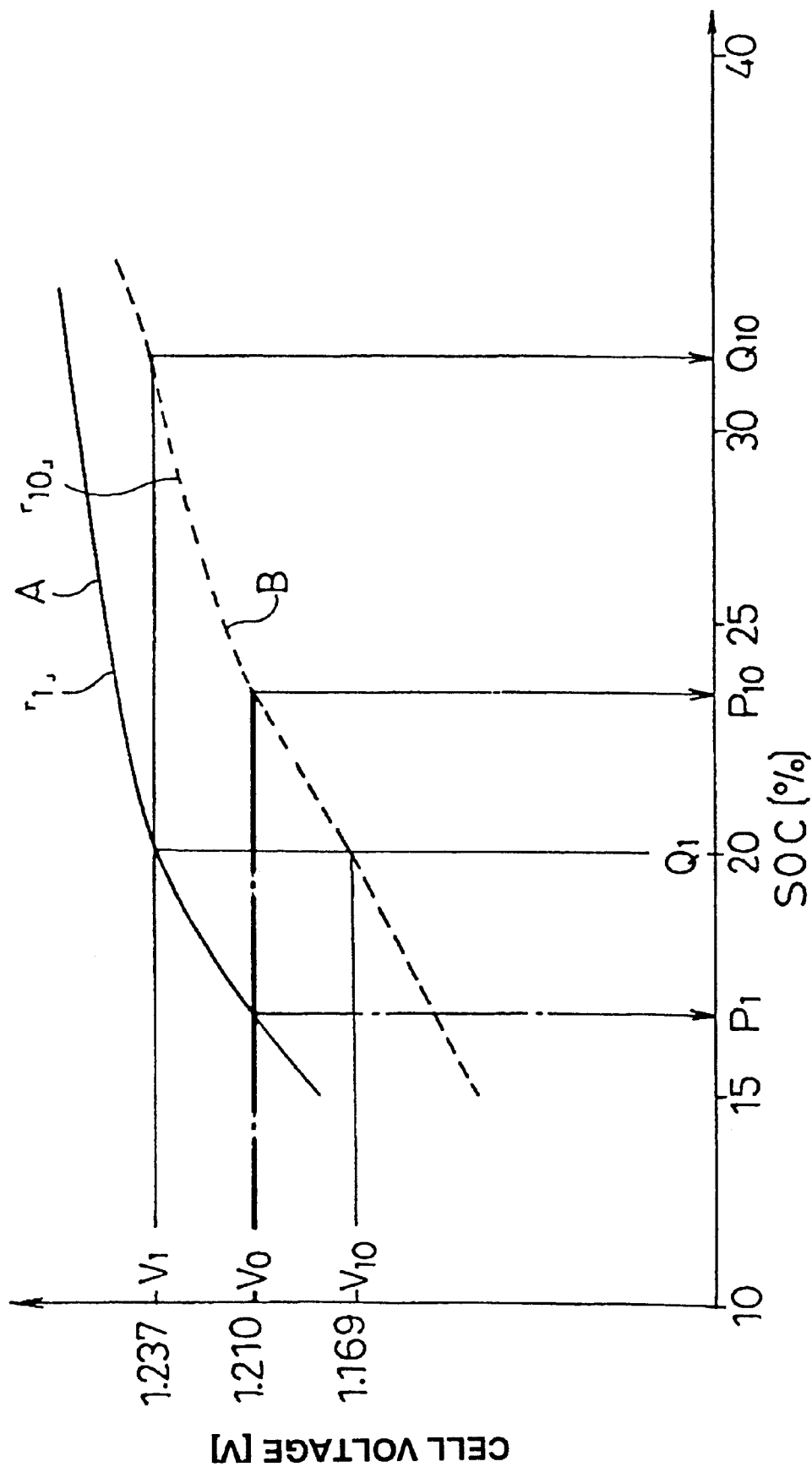
FIG. 1 is a graph showing to a larger scale a part of discharge characteristic curves indicative of the relationship between the SOC and voltage at the time of discharge.

FIG. 1 shows the discharge characteristic curve A at the first discharge and the discharge characteristic curve B at the tenth discharge. Provided that the voltage for determination when the SOC is 20% is set to be 1.237V as in the prior art, it will be correctly determined that the SOC has reached the allowable lower limit where the SOC is 20% (shown by $Q_1$) after the first discharge, but after the tenth discharge, it will be erroneously determined, when the SOC is still 30% (shown by $Q_{10}$), that the SOC has already reached the allowable lower limit.

In view of the above, in this embodiment, in determining the above voltage for determination, not only the voltage value ($V_1$) when the SOC reaches the allowable lower limit value after the first discharge, but also other voltage values ($V_{10}$ and others) when the SOC reaches the allowable lower limit after subsequent discharges are taken into consideration, and thus the voltage for determination is set lower ($V_0$) than the voltage ($V_1$) after the first discharge. Specifically, in the case shown in FIG. 1, the voltage for determination ($V_0$) is set to be 1.210V. In this way, when it is determined that the SOC has reached the allowable lower limit at the first discharge, the actual value of the SOC (P1) will be 16~17%. Meanwhile, when it is determined that SOC has reached the allowable lower limit at the tenth discharge, the actual value of the SOC ($P_{10}$) will be 23~24%, so, in either case, there will be a small discrepancy in relation to the reference value of the SOC of 20%. It is desirable that there is only ±5% discrepancy; FIG. 1 shows the case wherein the voltage for determination ($V_0$) is set appropriately so that the discrepancy is kept within the range of ±5%.

It is further preferable to set the above voltage for determination ($V_0$) 0.01~0.010V per one cell lower than the voltage value ($V_1$) when the SOC reaches the permissible lower limit after the first discharge.

Decreasing rate of voltage of the discharge characteristic curve caused by the memory effect reduces as the charge and discharge are repeated many times, and there is not a large difference, for example, between the decreasing rate at the twentieth discharge and that at the tenth discharge. Accordingly, discharge characteristic curves after the first to, approximately, tenth discharge will suffice to provide a data, based on which the above voltage for determination ($V_0$) is determined.

In this embodiment, a determination is made whether the SOC of the secondary battery has reached a permissible lower limit, using the voltage ($V_0$) for determination determined as described above. Discharge electric current, battery temperature, and voltage (V) of the secondary battery to be determined are first measured, the voltage for determination ($V_0$) which corresponds to the obtained discharge electric current and battery temperature is selected and compared with the voltage (V), and when $V \leq V_0$ it is ascertained that the SOC has reached the allowable lower limit.

Next, another embodiment of the present invention will be described. In this embodiment, the above voltage for determination ($V_0$) is a variable, so that it is suitably determined in accordance with the number of times of charge and discharge. In this way, the actual value of the SOC when it is determined to have reached the allowable lower limit at any time of discharge can be made even closer to the value of the lower limit of the SOC (an SOC of 20%, for example) which is used as the determination reference.

By way of example, in the case shown in FIG. 2 and Table 1, if the values denoted $V_{01} \sim V_{010}$ in Table 1 are used as the voltage for determination in accordance with the number of times of charge and discharge, the actual value of the SOC when it is determined to have reached the permissible lower limit and the lower limit of the SOC (an SOC of 20%) which is the determination reference can be made almost the same.

The voltage for determination may be determined corresponding to each time of charge and discharge as in the case shown in Table 1, but it can also be determined in steps by dividing the number of times of charge and discharge into groups. For example, the voltage for determination can be determined as shown in the following Table 2 ($V_{01} \sim V_{010}$)

TABLE 2

| Charge/discharge number of times | Voltage for determination |
|---|---|
| 1 | $V_{01}$ |
| 2, 3 | $V_{023}$ |
| 4–6 | $V_{046}$ |
| 7–9 | $V_{079}$ |
| 10 or more | $V_{010}$ |

In this embodiment, as described above, a determination is made whether the SOC of the secondary battery has reached a permissible lower limit, using the voltage for determination determined in accordance with the number of times of charge and discharge as described above. At the time of Nth discharge, the discharge electric current, battery temperature, and voltage (V) of the secondary battery to be determined are measured, the voltage for determination ($V_{ON}$) which corresponds to the measured discharge electric current and battery temperature as well as to the Nth time of discharge is selected and compared with the voltage (V), and when $V \leq V_{ON}$ it is determined that the SOC has reached the allowable lower limit.

As set forth above, according to the present invention, whether the SOC of a secondary battery which uses a nickel-hydroxide positive electrode has reached a permissible lower limit at the final discharge can be correctly determined by measuring the voltage of the battery, wherefore the present invention is useful in preventing overdischarge and overcharge of a battery and in precisely controlling charge and discharge of a battery.

What is claimed is:

1. A method of determining an end of discharge voltage of a secondary battery which has a positive electrode of nickel-hydroxide based on a state of charge (SOC) of the battery, comprising the steps of:

setting an allowable lower limit of the SOC of the battery;

determining a voltage at which the SOC is the set lower limit after a first discharge of the battery;

determining voltages at which the SOC is the set lower limit after subsequent discharges of the battery after recharge of the battery, wherein the voltage at which the SOC is the set lower limit for discharges after the first discharge gradually decreases in view of a memory effect of the battery; and determining the end of discharge voltage in consideration of the voltages at which the SOC is the set lower limit after the first and subsequent discharges whereby the end of discharge voltage is lower than the voltage at which the SOC is the set lower limit after the first discharge.

2. The method according to claim 1, further comprising the step of setting the end of discharge voltage from 0.01 to about 0.10V lower than the voltage at which the SOC is the set lower limit after the first discharge.

3. The method according to claim 1, further comprising the steps of:

determining an actual SOC after the first and subsequent discharges of the battery;

setting a permissible range of deviation between the actual SOC of the battery after the first and subsequent discharges and the set lower limit of the SOC; and changing the end of discharge voltage if any of the actual SOC of the battery after the first and subsequent discharges is outside of the permissible range of deviation.

4. The method according to claim 3, wherein the permissible range of deviation is set at ±5%.

5. The method according to claim 1, wherein the step of setting the allowable lower limit of the SOC of the battery comprises the step of setting the lower limit of the SOC to be 20%.

6. The method according to claim 1, wherein the step of determining the voltage at which the SOC is the set lower limit after subsequent discharges of the battery comprises the step of determining the voltage at which the SOC is the set lower limit after nine sequential discharges of the battery.

7. A method of determining an end of discharge voltage of a secondary battery which has a positive electrode of nickel-hydroxide based on a state of charge (SOC) of the battery, comprising the steps of:

setting an allowable lower limit of the SOC of the battery;

determining a voltage at which the SOC is the set lower limit after a first discharge of the battery;

determining voltages at which the SOC is the set lower limit after subsequent discharges of the battery after recharge of the battery, wherein the voltage at which the SOC is the set lower limit for discharges after the first discharge gradually decreases in view of a memory effect of the battery; and determining a plurality of different end of discharge voltages in consideration of the voltages at which the SOC is the set lower limit after the first and subsequent discharges such that the end of discharge voltage varies based on the number of times of charge and discharge of the battery.

8. The method according to claim 7, further comprising the step of associating each of the end of discharge voltages with at least one discharge of the battery.

9. The method according to claim 7, further comprising the step of associating at least one of the end of discharge voltages with a plurality of discharges of the battery.

10. The method according to claim 7, wherein the step of setting the allowable lower limit of the SOC of the battery comprises the step of setting the lower limit of the SOC to be 20%.

11. The method according to claim 7, wherein the step of determining the voltage at which the SOC is the set lower limit after subsequent discharges of the battery comprises the step of determining the voltage at which the SOC is the set lower limit after nine sequential discharges of the battery.

12. A method for increasing the efficiency of a rechargeable battery while preventing overdischarge of the battery, comprising the steps of:

setting an allowable lower limit of a state of charge (SOC) of the battery;

determining voltages at which the SOC is the set lower limit after a plurality of sequential discharges of the battery, the battery being recharged between discharges, wherein the voltages at which the SOC is the set lower limit for discharges after a first one of the discharges are less than the voltage at which the SOC is the set lower limit after the first discharge in view of a memory effect of the battery;

determining an end of discharge voltage in consideration of the voltages at which the SOC is the set lower limit after the plurality of sequential discharges, the determination voltage being lower than the voltage at which the SOC is the set lower limit after the first discharge; and stopping discharge of the battery when the voltage reaches the end of discharge voltage.

13. The method according to claim 12, further comprising the step of setting the end of discharge voltage from 0.01V to about 0.10V lower than the voltage at which the SOC is the set lower limit after the first discharge.

14. The method according to claim 12, further comprising the steps of:

determining an actual SOC after the discharges of the battery;

setting a permissible range of deviation between the actual SOC after the discharges and the set lower limit of the SOC; and changing the end of discharge voltage if the actual SOC of the battery after any of the discharges is outside of the permissible range of deviation.

15. The method according to claim 14, wherein the permissible range of deviation is set at ±5%.

16. The method according to claim 12, wherein the battery is a secondary battery which has a positive electrode of nickel-hydroxide.

17. The method according to claim 12, wherein the step of setting the allowable lower limit of the SOC of the battery comprises the step of setting the lower limit of the SOC to be 20%.

18. The method according to claim 12, wherein the step of determining the voltages at which the SOC is the set lower limit after the plurality of sequential discharges of the battery comprises the step of determining the voltages at which the SOC is the set lower limit after ten sequential discharges of the battery.

* * * * *